US012501498B2

(12) United States Patent
Koyanagi et al.

(10) Patent No.: US 12,501,498 B2
(45) Date of Patent: Dec. 16, 2025

(54) MANAGEMENT SYSTEM OF MOBILE COMMUNICATION SYSTEM, CORE NETWORK, MOBILE COMMUNICATION SYSTEM, METHOD, AND PROGRAM

(71) Applicant: NEC Corporation, Tokyo (JP)

(72) Inventors: Kenji Koyanagi, Tokyo (JP); Hiroaki Aminaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 550 days.

(21) Appl. No.: 17/909,838

(22) PCT Filed: Mar. 16, 2021

(86) PCT No.: PCT/JP2021/010529
§ 371 (c)(1),
(2) Date: Sep. 7, 2022

(87) PCT Pub. No.: WO2021/200099
PCT Pub. Date: Oct. 7, 2021

(65) Prior Publication Data
US 2024/0205986 A1    Jun. 20, 2024

(30) Foreign Application Priority Data
Mar. 31, 2020    (JP) .................................. 2020-062575

(51) Int. Cl.
*H04W 76/11*    (2018.01)
*H04W 8/04*    (2009.01)
(Continued)

(52) U.S. Cl.
CPC .............. *H04W 76/11* (2018.02); *H04W 8/04* (2013.01); *H04W 8/20* (2013.01); *H04W 76/50* (2018.02)

(58) Field of Classification Search
CPC .......... H04W 8/04; H04W 8/14; H04W 8/20; H04W 28/08; H04W 36/22; H04W 76/10;
(Continued)

(56) References Cited

U.S. PATENT DOCUMENTS

| 8,929,923 B2* | 1/2015 | Gao | H04W 64/00 455/418 |
| 8,953,558 B2* | 2/2015 | Aoyagi | H04W 48/02 455/436 |

(Continued)

FOREIGN PATENT DOCUMENTS

| JP | H02-123834 A | 5/1990 |
| JP | 2012-530433 A | 11/2012 |

(Continued)

OTHER PUBLICATIONS

International Search Report for PCT Application No. PCT/JP2021/010529, mailed on May 25, 2021.

(Continued)

*Primary Examiner* — Alpus Hsu
(74) *Attorney, Agent, or Firm* — Sughrue Mion, PLLC (57) ABSTRACT

In order to share a mobile communication system among a plurality of mobile communication operators for enabling provision of a more flexible service than before, a management system includes: an obtaining unit configured to obtain identification information of a first terminal apparatus managed by a first mobile communication operator, and identification information of a second terminal apparatus managed by a second mobile communication operator different from the first mobile communication operator; and a first transmitting unit configured to transmit, to a core network node managing a terminal apparatus connected to a core network in a mobile communication system, the identification infor- (Continued)

mation of the first terminal apparatus and the identification information of the second terminal apparatus.

14 Claims, 10 Drawing Sheets

(51) Int. Cl.
  *H04W 8/20* (2009.01)
  *H04W 76/50* (2018.01)
(58) Field of Classification Search
  CPC ..... H04W 76/11; H04W 76/19; H04W 76/50; H04W 92/24
  See application file for complete search history.

(56) References Cited

U.S. PATENT DOCUMENTS

| | | | |
|---|---|---|---|
| 9,560,508 B2* | 1/2017 | Ueda | H04W 12/08 |
| 9,930,583 B2* | 3/2018 | Hara | H04W 36/0085 |
| 10,512,022 B2* | 12/2019 | Enomoto | H04W 68/005 |
| 2012/0106504 A1 | 5/2012 | Klatt et al. | |
| 2016/0113057 A1* | 4/2016 | Haneji | H04W 76/25 |
| | | | 370/328 |
| 2018/0035284 A1 | 2/2018 | Fujinami | |
| 2018/0070262 A1 | 3/2018 | Nakano et al. | |
| 2019/0029065 A1* | 1/2019 | Park | H04W 60/00 |
| 2019/0230722 A1* | 7/2019 | Kawasaki | H04W 76/16 |
| 2019/0281040 A1* | 9/2019 | Dhamankar | G06Q 20/085 |
| 2020/0029380 A1* | 1/2020 | Kawasaki | H04W 4/00 |
| 2020/0137552 A1* | 4/2020 | Park | H04W 8/08 |
| 2020/0280836 A1* | 9/2020 | Velev | H04W 8/12 |
| 2020/0314936 A1* | 10/2020 | Kawasaki | H04W 4/00 |
| 2020/0413244 A1* | 12/2020 | Park | H04W 76/27 |
| 2021/0219151 A1* | 7/2021 | Fiorese | H04W 24/02 |

FOREIGN PATENT DOCUMENTS

| | | |
|---|---|---|
| JP | 2017-192003 A | 10/2017 |
| WO | 2016/125493 A1 | 8/2016 |
| WO | 2016/148001 A1 | 9/2016 |

OTHER PUBLICATIONS

English translation of Written opinion for PCT Application No. PCT/JP2021/010529, mailed on May 25, 2021.

* cited by examiner

SERVICE (APPLICATION) PRIORITY TABLE

901

| APPLICATION 1 | APPLICATION 2 | ... |
|---|---|---|
| 1 | 0 | ... |

TERMINAL TYPE PRIORITY TABLE

902

| TERMINAL TYPE 1 | TERMINAL TYPE 2 | ... |
|---|---|---|
| 0 | 1 | ... |

LICENSEE PRIORITY TABLE

903

| | LICENSEE | |
|---|---|---|
| | LICENSEE A | LICENSEE B |
| ORDINARY TIME | 2 | 1 |
| DISASTER | 4 | 2 |

Fig. 9

MANAGEMENT SYSTEM OF MOBILE COMMUNICATION SYSTEM, CORE NETWORK, MOBILE COMMUNICATION SYSTEM, METHOD, AND PROGRAM

This application is a National Stage Entry of PCT/JP2021/010529 filed on Mar. 16, 2021, which claims priority from Japanese Patent Application 2020-062575 filed on Mar. 31, 2020, the contents of all of which are incorporated herein by reference, in their entirety.

TECHNICAL FIELD

The present invention relates to a management system, a core network, a mobile communication system, a method, and a program.

BACKGROUND ART

For mobile communication systems such as a Long Term Evolution (LTE) network, it has heretofore been studied to share a radio access network (RAN) or a core network among a plurality of mobile communication operators.

PTL 1 describes that shared time slots of a plurality of radio frequency channels provided by a radio access network are shared by a plurality of mobile communication operators.

PTL 2 describes that a system code and an area code of a different licensee are included in each signal transmitted from a base station to a land mobile station in a regional disaster prevention radio system, to enable mutual communication with a different licensee by the land mobile station.

CITATION LIST

Patent Literature

[PTL 1] JP 2012-530433 T
[PTL 2] JP 02-123834 A

SUMMARY

Technical Problem

However, in the technique described in PTL 1, time slots to be shared are restricted, which reduces radio resources to be shared. For communication with different mobile communication operators, a more flexible method than the technique described in PTL 2 has been desired.

An example object of the present invention is to enable, by sharing a mobile communication system among a plurality of mobile communication operators, provision of a more flexible service than before.

Solution to Problem

A management system according to an example aspect of the present invention includes: an obtaining unit configured to obtain identification information of a first terminal apparatus managed by a first mobile communication operator, and identification information of a second terminal apparatus managed by a second mobile communication operator different from the first mobile communication operator; and a first transmitting unit configured to transmit, to a core network node managing a terminal apparatus connected to a core network in a mobile communication system, the identification information of the first terminal apparatus and the identification information of the second terminal apparatus.

A method according to an example aspect of the present invention includes: obtaining identification information of a first terminal apparatus managed by a first mobile communication operator, and identification information of a second terminal apparatus managed by a second mobile communication operator different from the first mobile communication operator; and transmitting, to a core network node managing a terminal apparatus connected to a core network in a mobile communication system, the identification information of the first terminal apparatus and the identification information of the second terminal apparatus.

A program according to an example aspect of the present invention is a program for causing a computer to execute the method.

A core network of a mobile communication system according to an example aspect of the present invention includes: a first node configured to store pieces of identification information of a plurality of respective terminal apparatuses managed by a plurality of different mobile communication operators; and a second node configured to authenticate a terminal apparatus to be connected to the core network, based on the pieces of identification information stored in the first node.

A mobile communication system according to an example aspect of the present invention includes: the core network; and a network platform configured to control communication performed via the core network.

A method according to an example aspect of the present invention includes: storing pieces of identification information of a plurality of respective terminal apparatuses managed by a plurality of different mobile communication operators; and authenticating a terminal apparatus to be connected to a core network of a mobile communication system, based on the pieces of identification information.

Advantageous Effects of Invention

According to the present invention, by sharing a mobile communication system among a plurality of mobile communication operators, provision of a more flexible service than before is enabled. Note that, according to the present invention, instead of or together with the above effects, other effects may be exerted.

DESCRIPTION OF THE EXAMPLE EMBODIMENTS

Hereinafter, example embodiments of the present invention will be described in detail with reference to the accompanying drawings. Note that, in the Specification and drawings, elements to which similar descriptions are applicable are denoted by the same reference signs, and overlapping descriptions may hence be omitted.

Descriptions will be given in the following order.
1. Overview of Example Embodiments of the Present Invention
2. First Example Embodiment
   2.1. Example of System Configuration
   2.2 Operation Example
3. Second Example Embodiment
   3.1. Example of System Configuration
   3.2. Operation Example
4. Other Example Embodiments
5. Supplementary Notes

1. Overview of Example Embodiments of the Present Invention

Example embodiments of the present invention enable, by sharing a radio core network (also referred to as a radio core NW) configuring a mobile communication system among a plurality of radio station licensees (also referred to as licensees below), provision of a more flexible service than before. The radio core NW indicates a radio base station(s) and a core network in the mobile communication system. The mobile communication system can be a system configuring an LTE network. The licensees indicate mobile communication operators. Each mobile communication operator may be, for example, a known mobile network operator (MNO) or may be an operator operating a private network such as local 5G. For example, the mobile communication operator may be a police station, a fire station, or the like.

According to the example embodiments of the present invention, radio core NWs of the plurality of respective licensees may be configured in the radio core NW shared by the plurality of licensees. In the radio core NW, communication between terminal apparatuses managed by the same licensee (i.e., the same mobile communication operator) may be permitted. For example, each of communication between terminal apparatuses managed by a fire station and communication between terminal apparatuses managed by a police station may be permitted. In case of an emergency such as a disaster, communication between terminal apparatuses of different licensees may be permitted in the radio core NW. For example, communication between a terminal apparatus managed by the fire station and a terminal apparatus managed by the police station may be permitted.

According to the example embodiments of the present invention, by switching, when the load of the mobile communication system increases, part of communication to use another mobile communication system, the load may be reduced. Moreover, by changing the priority of the communication that is not switched, the communication that is not switched may be maintained.

Note that the above-described overview of the example embodiments of the present invention is merely an example and is not intended to limit example embodiments of the present invention.

2. First Example Embodiment

Next, a first example embodiment of the present invention will be described with reference to FIGS. 1 to 9.

<2.1. Example of System Configuration>

Figure 1:
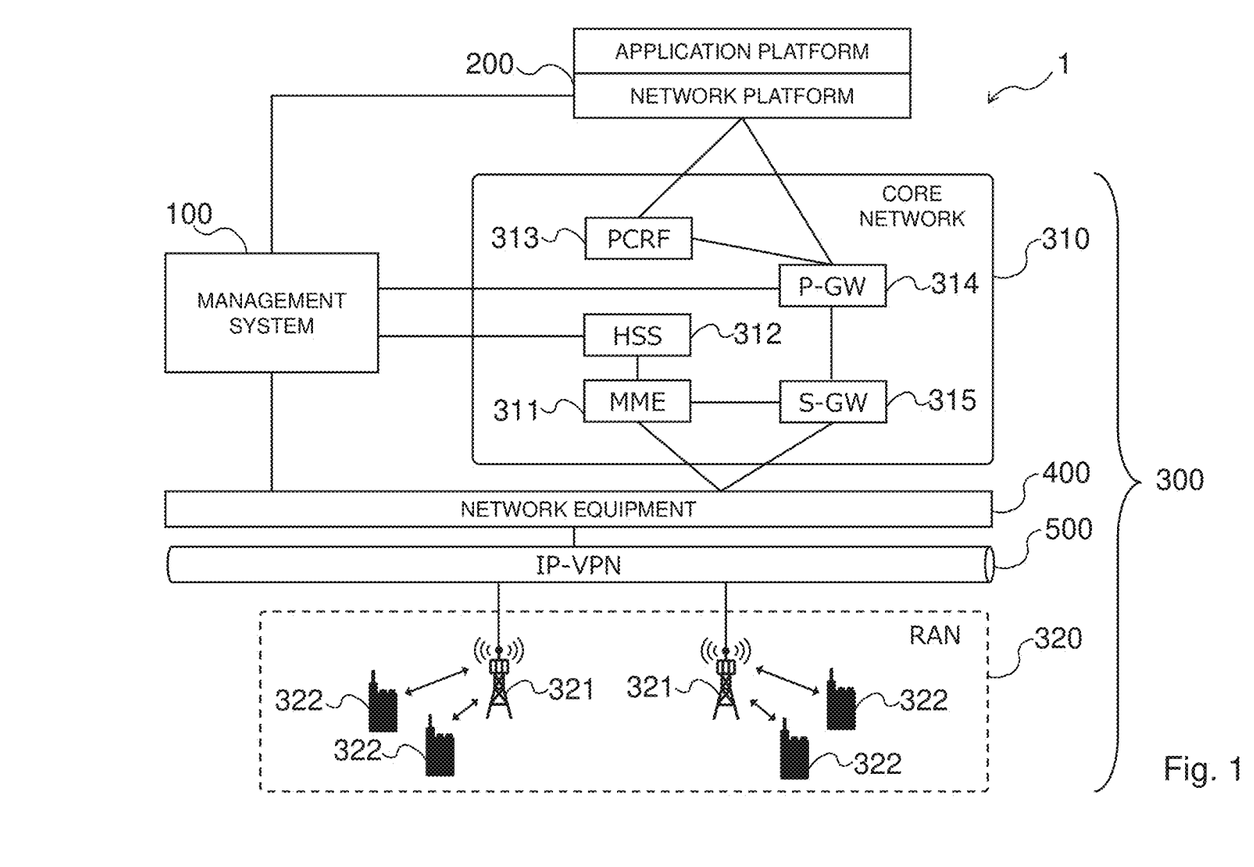
FIG. 1 is a diagram illustrating a configuration example of a mobile communication system according to a first example embodiment.

FIG. 1 illustrates a configuration example of a mobile communication system according to the present example embodiment.

A mobile communication system 1 includes a management system 100, a network platform 200, and an LTE network 300. The management system may be referred to as an operating system.

The LTE network 300 includes a core network 310 and a radio access network (RAN) 320. The core network 310 may be an evolved packet core (EPC), and the radio access network 320 may be an evolved universal terrestrial radio access network (E-UTRAN). The LTE network 300 may alternatively be configured of a third-generation mobile communication system (3G), a fifth-generation mobile communication system (5G), or the like. The LTE network 300 may be a radio communication network used for urgent services such as police, fire fighting, and emergency services as well as a municipality, electricity, gas, water supply, and the like.

The core network 310 includes a plurality of logical nodes such as an MME 311, an HSS 312, a PCRF 313, a P-GW 314, and an S-GW 315, to provide functions of user authentication, mobile control, bearer management, charging, quality of service (QoS) control, and the like.

The mobility management entity (MME) 311 provides functions including mobile control such as handover, bearer management, and the like. The MME 311 provides the function of user authentication performed by using identification information of each terminal apparatus stored in the HSS 312.

The home subscriber server (HSS) 312 provides the function of managing contract information and identification information of each user. The identification information may be a subscriber identification number, for example, an international mobile subscriber identity (IMSI), registered in a subscriber identity module (SIM) card inserted into a terminal apparatus for use. The identification information may be received from the management system 100 and stored.

The policy and charging rules function (PCRF) 313 provides a function of determining a charging system, QoS, and the like to be used for data packets transmitted/received to/from each terminal apparatus. The P-GW 314, the S-GW 315, and the radio base stations 321 are notified of a QoS value determined by the PCRF 313, and QoS control is performed according to the QoS value.

The packet data network gateway (P-GW) 314 provides the function of transmitting/receiving data packets to/from each terminal apparatus, and the like.

The serving gateway (S-GW) 315 provides the function of relaying data packets transmitted/received to/from each terminal apparatus.

The logical node may be implemented with one or a plurality of computer apparatuses. The core network 310 may also include other logical nodes in addition to the logical nodes.

The management system 100 is connected to the HSS 312, and can obtain the identification information of each terminal apparatus registered by an operator and transmit the identification information to the HSS 312. The management system 100 can also transmit the identification information to the network platform 200.

In a known technique, as pieces of identification information managed by the HSS 312, pieces of identification information of only terminal apparatuses of a single licensee managing the radio core NW are registered, and hence the radio core NW is not shared among different licensees. However, in the present example embodiment, the management system 100 registers pieces of identification information of terminal apparatuses managed by a plurality of different licensees, which allows the radio core NW to be shared.

The management system 100 is also connected to the P-GW 314, the network platform 200, and network equipment 400 and provides a function of monitoring traffic information.

The radio access network (RAN) 320 includes one or a plurality of radio base stations 321 and one or a plurality of terminal apparatuses 322. The one or plurality of radio base stations 321 are connected to the core network 310 via an Internet protocol virtual private network (IP-VPN) 500 and the network equipment 400. The one or plurality of radio base stations 321 may be an evolved Node(s) B (eNodeB).

Figure 2:
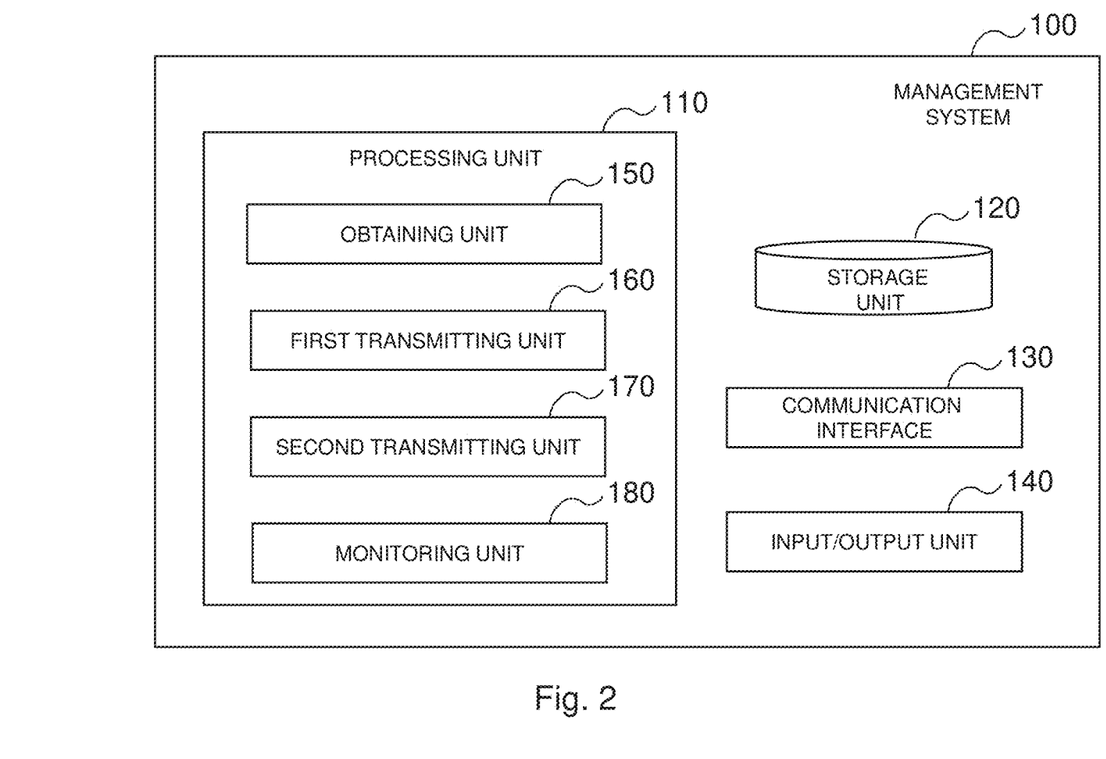
FIG. 2 is a diagram illustrating a configuration example of a management system according to the first example embodiment.

FIG. 2 illustrates a configuration example of a management system according to the present example embodiment. The management system 100 includes a processing unit 110, a storage unit 120, a communication interface 130, and an input/output unit 140.

The storage unit 120 stores identification information of a terminal apparatus input by an operator via the input/output unit 140. The storage unit 120 stores load information of the network.

The communication interface 130 functions as an interface for performing communication with an external apparatus.

The input/output unit 140 provides an input/output function for an operator to use the management system 100.

The processing unit 110 includes an obtaining unit 150, a first transmitting unit 160, a second transmitting unit 170, and a monitoring unit 180.

The obtaining unit 150 obtains information stored in the storage unit 120. For example, the obtaining unit 150 obtains the identification information of each terminal apparatus and load information of the network stored in the storage unit 120.

The first transmitting unit 160 is connected to the HSS 312 via the communication interface 130. The first transmitting unit 160 transmits the identification information obtained from the storage unit 120 to the HSS 312.

The second transmitting unit 170 is connected to the network platform 200 via the communication interface 130. The second transmitting unit 170 transmits the identification information and the load information obtained from the storage unit 120, priority information, and the like to the network platform 200.

The monitoring unit 180 is connected to the network equipment 400 via the communication interface 130. The monitoring unit 180 collects load information of the network and stores the collected load information in the storage unit 120. Note that the monitoring unit 180 may be implemented as a system different from the management system 100.

Note that the constituent elements of the processing unit 110 are not limited to the above-described constituent elements and may also include constituent elements other than the above-described constituent elements.

The above-described constituent elements may be implemented with one or more processors and a memory (e.g., a nonvolatile memory and/or a volatile memory) and/or a hard disk. The above-described constituent elements may be implemented with the same processor or may be implemented with separate processors. The memory may be included in the one or more processors or may be provided outside the one or more processors.

One or more computer apparatuses configuring the management system 100 may include a memory configured to store a program (instructions) and one or more processors that can execute the program (instructions). The one or more processors may execute the program and thereby perform operations of the above-described constituent elements. The program may be a program for causing the processor(s) to execute the operations of the above-described constituent elements.

Figure 3:
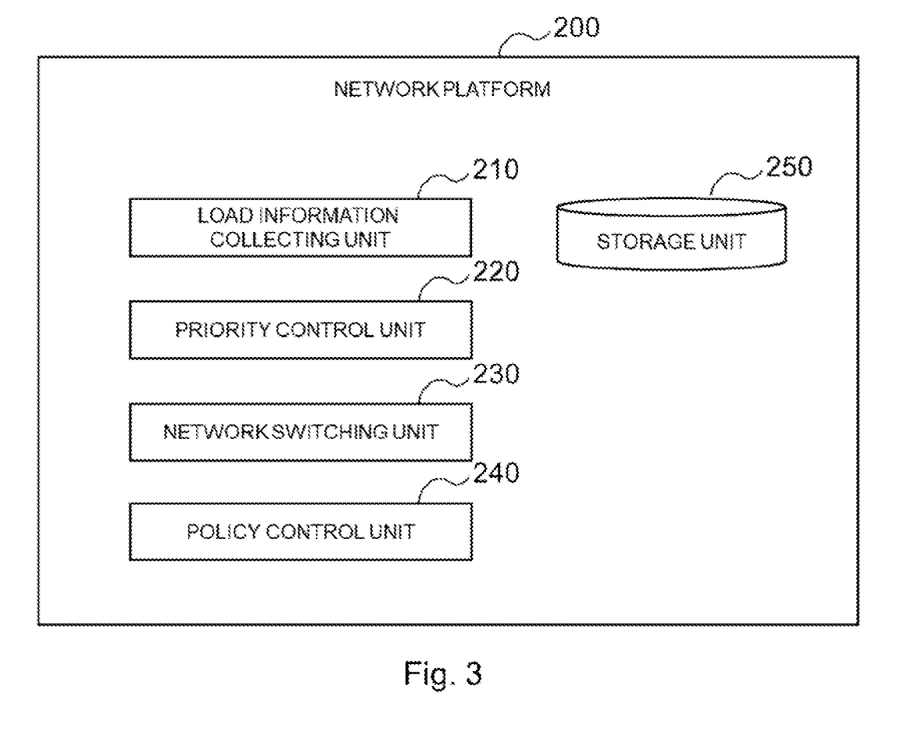
FIG. 3 is a diagram illustrating a configuration example of a network platform according to the first example embodiment.

FIG. 3 illustrates a configuration example of a network platform according to the present example embodiment.

The network platform 200 includes a load information collecting unit 210, a priority control unit 220, a network switching unit 230, a policy control unit 240, and a storage unit 250.

The load information collecting unit 210 collects load information of the network platform 200 and stores the collected load information in the storage unit 250. The load information collecting unit 210 can also receive the load information from the management system 100.

The priority control unit 220 controls the priority of communication by each terminal apparatus.

The network switching unit 230 can switch communication between part of terminal apparatuses to another mobile communication network. The switching of communication can be performed based on the load information of the network according to the priorities of the communication of the terminal apparatuses, for example.

The policy control unit 240 controls an operation policy of each terminal apparatuses.

The network platform 200 includes an application platform in a higher layer and implements one or a plurality of applications such as push to talk (PTT). In other words, the LTE network 300 may provide one or a plurality of services according to one or a plurality of applications such as a PTT service.

The network platform 200 or the application platform in the higher layer functions as a communication control unit configured to control communication between terminal apparatuses. Details will be described later.

Note that the constituent elements of the network platform 200 are not limited to the above-described constituent elements and may also include constituent elements other than the above-described constituent elements.

The above-described constituent elements may be implemented with one or more processors and a memory (e.g., a nonvolatile memory and/or a volatile memory) and/or a hard disk. The above-described constituent elements may be implemented with the same processor or may be implemented with separate processors. The memory may be included in the one or more processors or may be provided outside the one or more processors.

One or more computer apparatuses configuring the network platform 200 may include a memory configured to store a program (instructions) and one or more processors that can execute the program (instructions). The one or more processors may execute the program and thereby perform operations of the above-described constituent elements. The program may be a program for causing the processor(s) to execute the operations of the above-described constituent elements.

(Sharing of Radio Core Network)

Next, sharing of the radio core NW by a plurality of licensees will be described.

Figure 4:
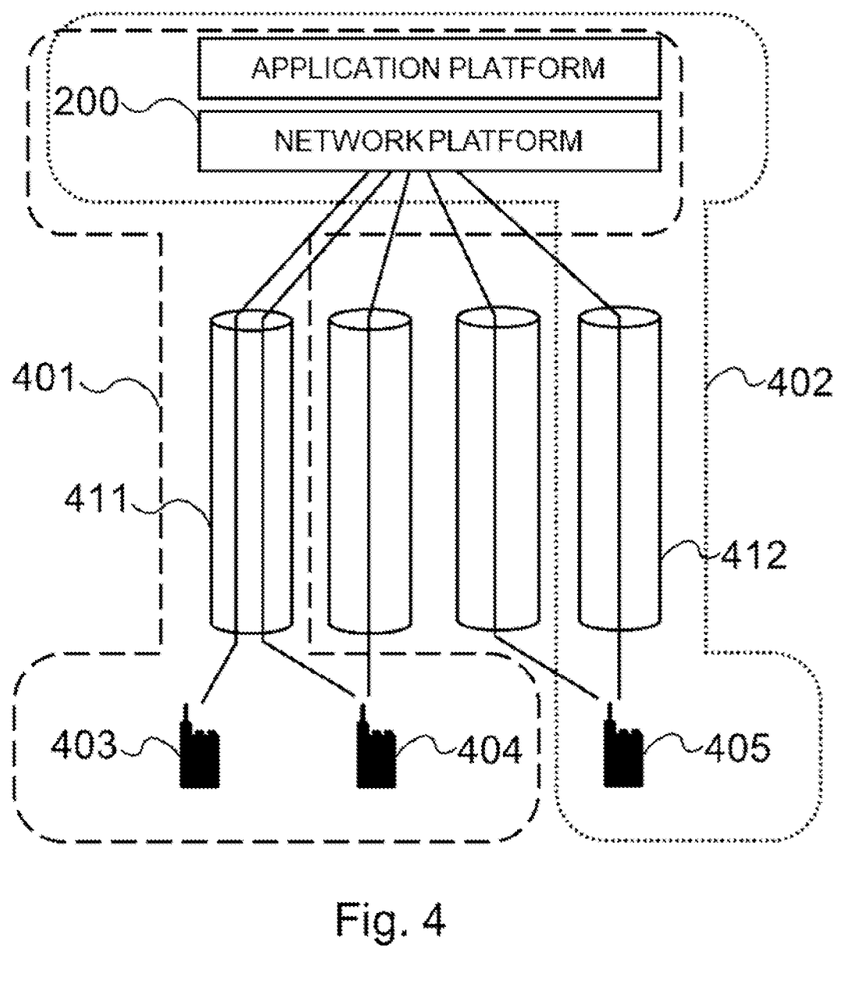
FIG. 4 is a diagram illustrating an example of a shared radio core network according to the first example embodiment.

FIG. 4 is a diagram illustrating an example of a shared radio core NW according to the present example embodiment. In the shared radio core NW according to the present example embodiment, by using a range enclosed with dashed lines 401 in FIG. 4, terminal apparatuses 403 and 404 of a police station being a licensee can communicate via a bearer 411, for example. By using the range enclosed with dotted lines 402 in FIG. 4, a terminal apparatus 405 of a fire station being another licensee can communicate via a bearer 412, for example.

Figure 5:
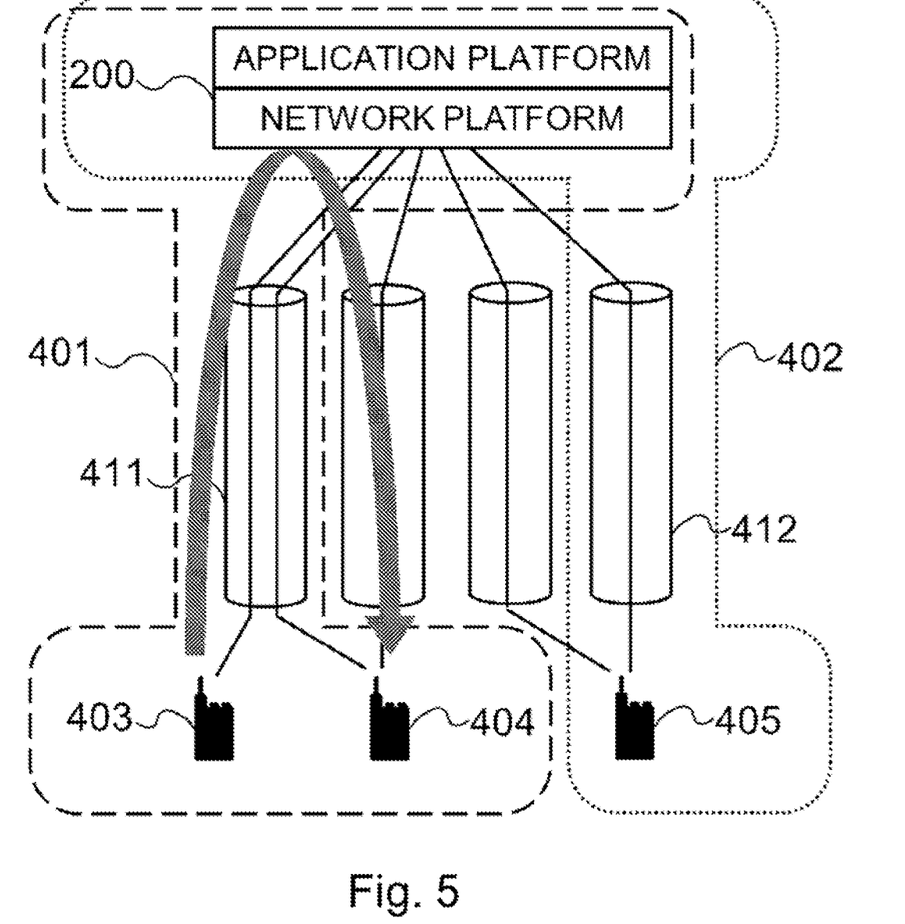
FIG. 5 is a diagram illustrating communication between terminals belonging to the same licensee.

FIG. 5 is a diagram illustrating communication between terminals belonging to the same licensee. As indicated by an arrow in FIG. 5, in the present example embodiment, communication between the terminal apparatuses belonging to the same licensee, for example, the terminal apparatus 403 and the terminal apparatus 404, is normally permitted in the shared radio core NW.

Figure 6:
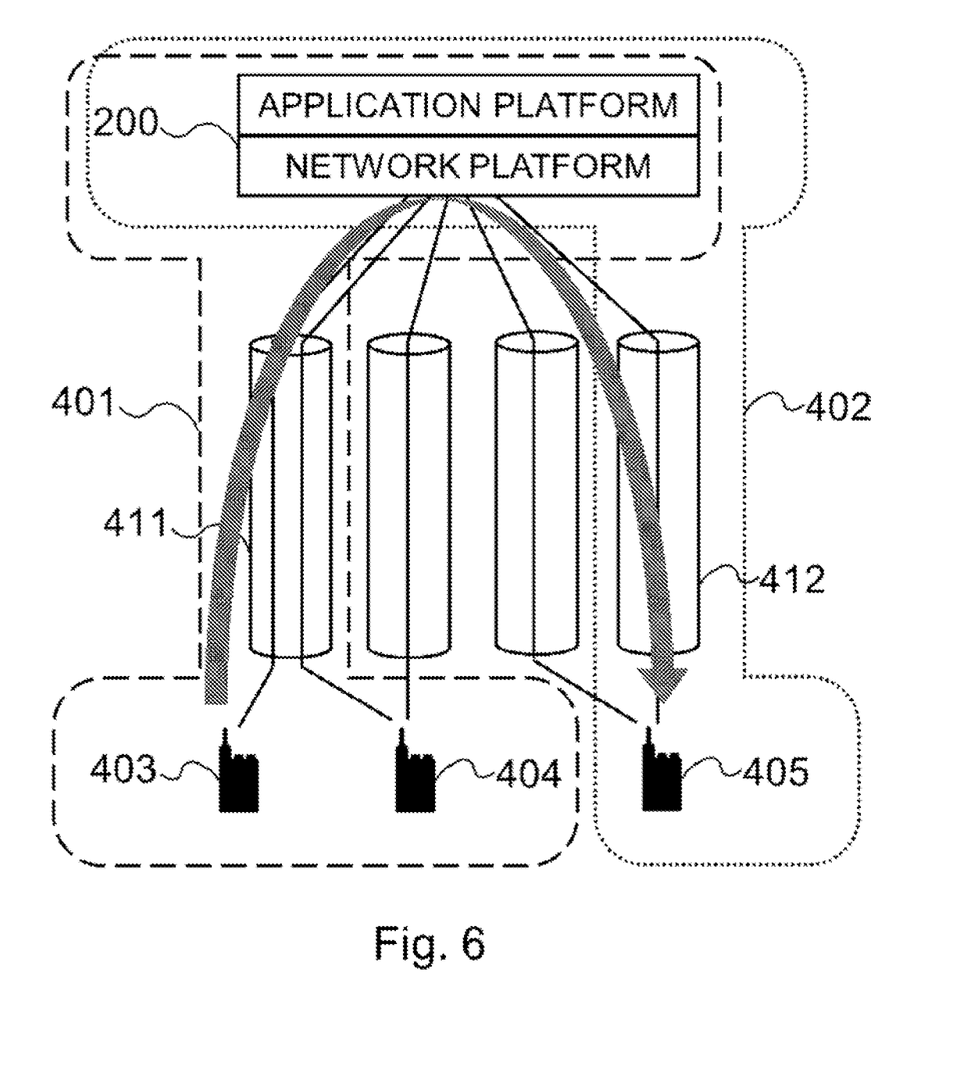
FIG. 6 is a diagram illustrating communication between terminals belonging to different licensees.

In contrast, as illustrated in FIG. 6, in the event of an emergency, communication between the terminal apparatuses belonging to different licensees, for example, the terminal apparatus 403 and the terminal apparatus 405, may be permitted in the shared radio core NW. Communication control in the event of an emergency can be performed, for example, in a case where an indication is made by an operator from the management system 100 to the network platform 200 or the application platform in the higher layer. Details will be described later.

<2.2. Operation Example>

In the present example embodiment, the operator makes configurations for authentication control and communication control in the management system 100, to thereby enable sharing of the radio core NW in the mobile communication system and consequently provision of a more flexible service than before.

(1) Authentication Control

First, authentication control according to the present example embodiment will be described. The authentication control to be described here is such control that, by registering pieces of identification information of terminal apparatuses managed by different licensees (i.e., different mobile communication operators) in the HSS 312, connection of the terminal apparatuses corresponding to the pieces of identification information is permitted through authentication processing by the MME 311.

Figure 7:
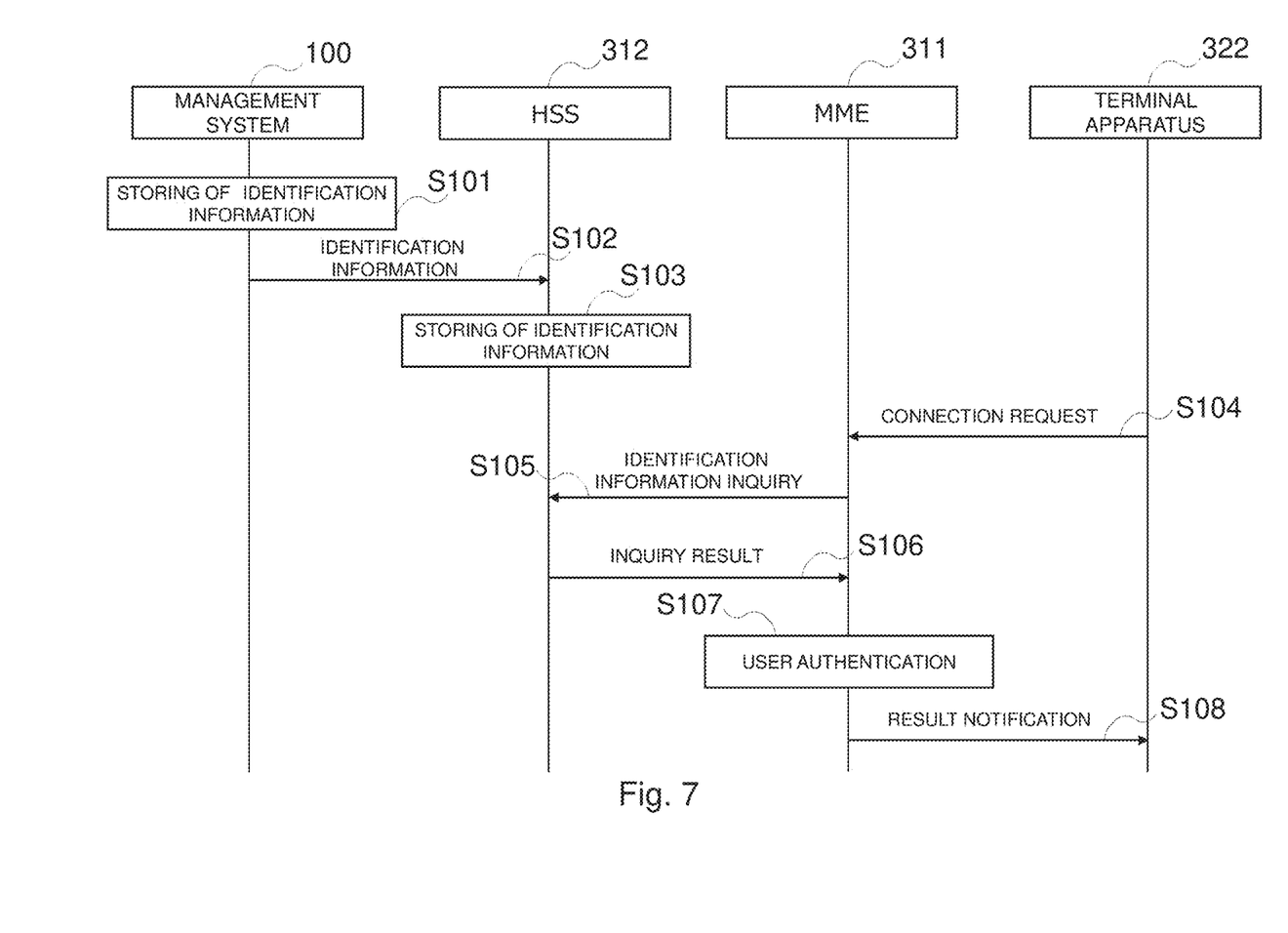
FIG. 7 is a sequence diagram of authentication control according to the first example embodiment.

FIG. 7 is a sequence diagram of the authentication control according to the present example embodiment.

First, in step S101, the management system 100 stores pieces of identification information of terminal apparatuses input by the operator. The pieces of identification information may be pieces of identification information of terminal apparatuses to which radio communication via the radio core NW is permitted and may include pieces of identification information of terminal apparatuses managed by a plurality of different licensees.

In step S102, the management system 100 obtains the stored pieces of identification information and transmits the obtained pieces of identification information to the HSS 312.

In step S103, the HSS 312 stores the received pieces of identification information.

Then, in step S104, the terminal apparatus 322 makes a connection request to the MME 311. When the connection request from the terminal apparatus 322 is received, the MME 311 inquires, of the HSS 312, the identification information of the terminal apparatus 322 in step S105. Then, in step S106, the MME 311 receives an inquiry result.

Then, in step S107, the MME 311 performs user authentication of the terminal apparatus 322, based on the inquiry result. Specifically, when the identification information of the terminal apparatus 322 for which the connection request is made is registered in the HSS 312, the MME 311 permits the connection.

In step S108, the MME 311 notifies the terminal apparatus 322 of an authentication result.

As described above, according to the present example embodiment, the MME 311 can perform user authentication, based on the identification information registered by the management system 100.

(2) Communication Control

Next, communication control according to the present example embodiment will be described. The communication control to be described here is such control that, by registering the pieces of identification information of the terminal apparatuses managed by the different licensees in the network platform 200 or the application platform in the higher layer, communication of the terminal apparatuses corresponding to the pieces of identification information is permitted by the network platform 200 or the application platform in the higher layer. According to an indication by the operator via the management system 100, the communication between the terminal apparatuses may be controlled. Further, by registering priority information of communication, control of communication according to priority can be enabled. As described above, the network platform 200 or the application platform in the higher layer can function as a communication control unit.

Figure 8:
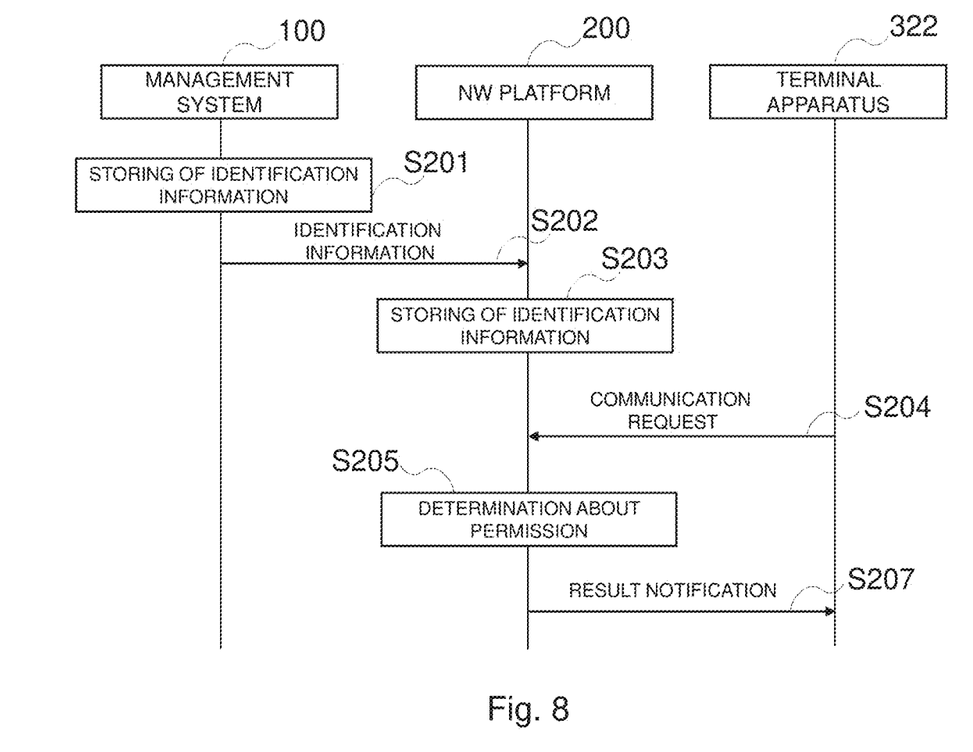
FIG. 8 is a sequence diagram of communication control according to the first example embodiment.

FIG. 8 illustrates a sequence diagram of the communication control according to the present example embodiment.

First, in step S201, the management system 100 stores pieces of identification information of terminal apparatuses input by the operator. Then, in step S202, the management system 100 obtains the stored pieces of identification information and transmits the obtained pieces of identification information to the network platform 200. Alternatively, the pieces of identification information are transmitted to the application platform in the higher layer. In step S203, the network platform 200 or the application platform stores the received pieces of identification information.

In step S204, the terminal apparatus 322 makes a communication request to the network platform 200 (or the application platform). When receiving the communication request from the terminal apparatus 322, the network platform 200 (or the application platform) determines whether or not to permit communication by the terminal apparatus 322 in step S105. Specifically, when the identification information of the terminal apparatus 322 from which the communication request is made is registered in the network platform 200 (or the application platform), the network platform 200 (or the application platform) permits the communication.

In step S205, the network platform 200 (or the application platform) makes notification about a determination result.

Note that control of communication between the terminal apparatuses belonging to the different licensees may be performed according to an indication by the operator in the event of an emergency such as the event of a disaster or the event of a congestion in the mobile communication system. In this case, a period in which communication is permitted may be a predetermined period. In other words, communication between the terminal apparatuses belonging to the different licensees can be permitted only in the predetermined period (for example, 24 hours or the like).

By registering priority information of communication in the network platform 200 (or the application platform), the network platform 200 (or the application platform) can allocate a communication path according to priority.

As described above, according to the present example embodiment, the network platform 200 (or the application platform) can perform communication control, based on pieces of identification information registered by the management system 100. In other words, the network platform 200 (or the application platform) functions as a communication control unit configured to control communication via the core network as described above.

(3) Network Switching

Next, a network switching function according to the present example embodiment will be described. When load heavier than a predetermined threshold is detected based on the load information collected by the load information collecting unit 210, the network platform 200 according to the present example embodiment can switch, by the network switching unit 230, communication between part of the terminal apparatuses to another mobile communication network. Such another mobile communication network being the switching destination may be an LTE network or may be a 3G network or a 5G network, and may be, for example, a network of a mobile virtual network operator (MVNO).

As an example, at the time of switching, the network to be used for communication can be determined by a mobile station, based on a mobile station measurement value such as a field intensity. The mobile station can use a field intensity offset (connection policy) notified by the network platform 200. As another example, in a case of collecting location information (cell information) of the mobile station and detecting a cell with heavy load, the network platform 200 increases the field intensity offset of the mobile station to thereby increase the rate at which the mobile station is connected to the MVNO network and consequently reduce the load more significantly.

The communication to be switched may be communication by a terminal apparatus with a low priority according to priority controlled by the priority control unit 220.

Priorities are registered in the management system 100 by the operator and are thereby transmitted to the network platform 200. A priority can be registered for each licensee, each service (application), and each type of terminal apparatuses, and a total priority is determined based on the priorities.

Figure 9:
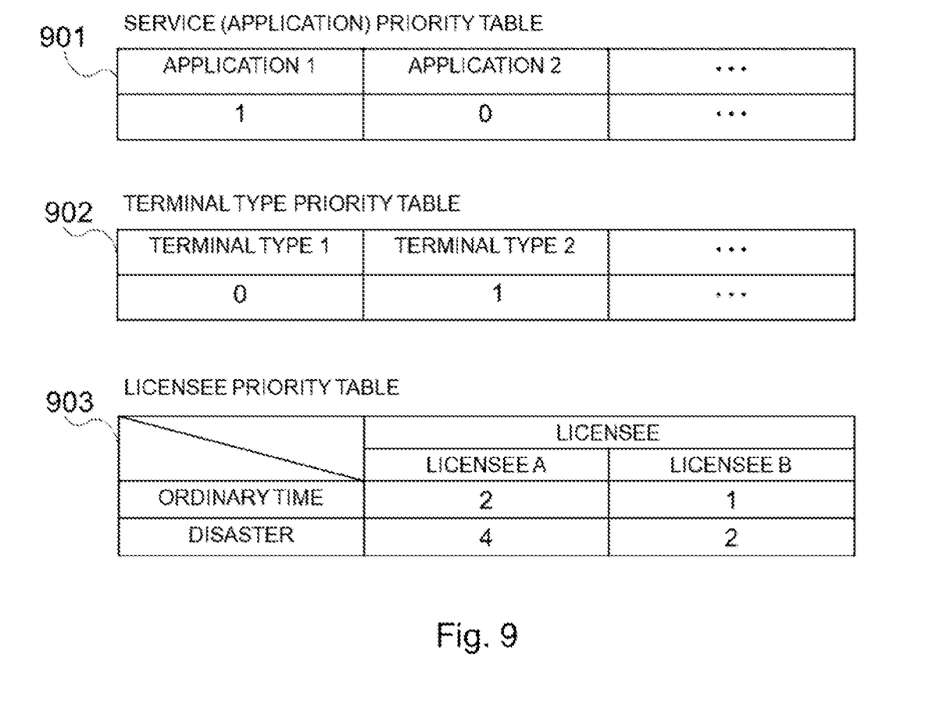
FIG. 9 is a diagram illustrating an example of priority tables according to the first example embodiment.

FIG. 9 illustrates an example of priority tables according to the present example embodiment. In each table, a larger numeric value of priority indicates a higher priority.

A service (application) priority table 901 retains a priority for each service (application). In the example illustrated in FIG. 9, the priority of "application 1" is "1", and the priority of "application 2" is "0".

A terminal type priority table 902 retains a priority for each terminal type. In the example illustrated in FIG. 9, the priority of "terminal type 1" is "0", and the priority of "terminal type 2" is "1".

A licensee priority table 903 retains priorities at an ordinary time and an emergency for each licensee. In the example illustrated in FIG. 9, at an ordinary time, the priority of "licensee A" is "2", and the priority of "licensee B" is "1". At an emergency, the priority of "licensee A" is "4", and the priority of "licensee B" is "2".

In the present example embodiment, communication control is performed according to a total priority calculated by using the priorities. The total priority may be the total value of the priorities, for example. As illustrated in the licensee priority table 903, by registering a larger value as the priority at an emergency, this case is given a higher priority more certainly.

The communication control may be performed based on QoS information mapped to the total priority in advance. As the communication control, communication interruption and traffic suppression by the application platform, change of a bearer (communication path) by the network platform 200, and communication interruption by a terminal apparatus may be performed.

The network platform 200 can perform, after switching communication by a terminal apparatus with a low priority as communication control, priority switching for a terminal apparatus with a high priority for which switching is not performed. In the priority switching, a bearer with a high priority is newly generated to use the bearer, for example. In this way, the communication quality of communication between terminal apparatuses that is not switched can be changed to higher communication quality.

3. Second Example Embodiment

Next, a second example embodiment of the present invention will be described with reference to FIG. 10. The above-described first example embodiment is a concrete example embodiment, whereas the second example embodiment is a more generalized example embodiment.

<3.1. Example of System Configuration>

Figure 10:
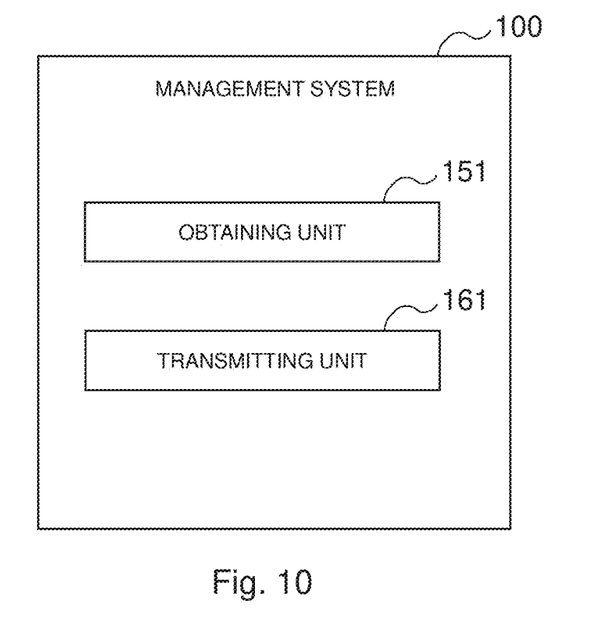
FIG. 10 is a diagram illustrating a configuration example of a management system according to a second example embodiment.

With reference to FIG. 10, a configuration example of a management system 100 according to the second example embodiment will be described.

FIG. 10 is a diagram illustrating an example of a schematic configuration of the management system 100 according to the second example embodiment. With reference to FIG. 10, the management system 100 includes an obtaining unit 151 and a transmitting unit 161. Concrete operations of the obtaining unit 151 and the transmitting unit 161 will be described later.

The obtaining unit 151 and the transmitting unit 161 may be implemented with one or more processors and a memory (e.g., a nonvolatile memory and/or a volatile memory) and/or a hard disk. The obtaining unit 151 and the transmitting unit 161 may be implemented with the same processor or may be implemented with separate processors. The memory may be included in the one or more processors or may be provided outside the one or more processors.

The management system 100 may include a memory configured to store a program (instructions) and one or more processors that can execute the program (instructions). The one or more processors may execute the program and thereby perform operations of the obtaining unit 151 and the transmitting unit 161. The program may be a program for causing the processor(s) to execute the operations of the obtaining unit 151 and the transmitting unit 161.

<3.2. Operation Example>

An operation example of the second example embodiment will be described.

According to the second example embodiment, the management system 100 (obtaining unit 151) obtains identification information of a first terminal apparatus managed by a first mobile communication operator and identification information of a second terminal apparatus managed by a second mobile communication operator different from the first mobile communication operator. The management system 100 transmits, to a core network node managing a terminal apparatus connected to a core network in a mobile communication system, the identification information of the first terminal apparatus and the identification information of the second terminal apparatus.

—Relationship with First Example Embodiment

As an example, the management system 100 of the second example embodiment is the management system 100 of the first example embodiment. In this case, the descriptions of the first example embodiment may also be applicable to the second example embodiment.

Note that the second example embodiment is not limited to this example.

As described above, according to the second example embodiment, a more flexible service than before can be provided in the mobile communication system.

4. Other Example Embodiments

Note that the present invention is not limited to the above-described example embodiments. It should be understood by those of ordinary skill in the art that the above-described example embodiments are merely examples and that various alterations are possible without departing from the scope and the spirit of the present invention.

For example, the steps in the processing described in the Specification may not necessarily be executed in time series in the order described in the corresponding flowchart. For example, the steps in the processing may be executed in an order different from that described in the corresponding flowchart or may be executed in parallel. Some of the steps in the processing may be deleted, or more steps may be added to the processing.

An apparatus including constituent elements of the base station described in the Specification (e.g., one or more apparatuses (or units) among a plurality of apparatuses (or units) constituting the base station or a module for one of the plurality of apparatuses (or units)) may be provided. Moreover, methods including processing of the constituent elements may be provided, and programs for causing a processor to execute processing of the constituent elements may be provided. Moreover, non-transitory computer readable recording media (non-transitory computer readable media) having recorded thereon the programs may be provided. It is apparent that such apparatuses, modules, methods, programs, and non-transitory computer readable recording media are also included in the present invention.

5. Supplementary Notes

The whole or part of the example embodiments disclosed above can be described as, but not limited to, the following supplementary notes.

(Supplementary Note 1)

An operating system comprising:

an obtaining unit configured to obtain identification information of a first terminal apparatus managed by a first mobile communication operator, and identification information of a second terminal apparatus managed by a second mobile communication operator different from the first mobile communication operator; and a first transmitting unit configured to transmit, to a core network node managing a terminal apparatus connected to a core network in a mobile communication system, the identification information of the first terminal apparatus and the identification information of the second terminal apparatus.

(Supplementary Note 2)

The operating system according to supplementary note 1, wherein communication between the first terminal apparatus and the second terminal apparatus is performed via a same core network.

(Supplementary Note 3)

The operating system according to supplementary note 1 or 2, wherein the obtaining unit is configured to obtain the identification information of the first terminal apparatus and the identification information of the second terminal apparatus registered by an operator.

(Supplementary Note 4)

The operating system according to any one of supplementary notes 1 to 3, wherein the core network node is a home subscriber server (HSS).

(Supplementary Note 5)

The operating system according to any one of supplementary notes 1 to 4, wherein the identification information includes an international mobile subscriber identity (IMSI).

(Supplementary Note 6)

The operating system according to any one of supplementary notes 1 to 5, further comprising a second transmitting unit configured to transmit the identification information of the first terminal apparatus and the identification information of the second terminal apparatus to a communication control unit configured to control communication via a core network shared by the first mobile communication operator and the second mobile communication operator, wherein the communication control unit is configured to permit, based on the identification information of the first terminal apparatus and the identification information of the second terminal apparatus, communication between a plurality of the first terminal apparatuses managed by the first mobile communication operator and communication between a plurality of the second terminal apparatuses managed by the second mobile communication operator.

(Supplementary Note 7)

The operating system according to supplementary note 6, wherein the communication control unit is configured to permit communication between the first terminal apparatus and the second terminal apparatus in a predetermined period.

(Supplementary Note 8)

The operating system according to supplementary note 7, wherein the communication between the first terminal apparatus and the second terminal apparatus is permitted according to an indication by an operator.

(Supplementary Note 9)

The operating system according to supplementary note 8, the communication between the first terminal apparatus and the second terminal apparatus is permitted when a disaster occurs or when a congestion occurs in the mobile communication system.

(Supplementary Note 10)

The operating system according to any one of supplementary notes 6 to 9, further comprising a monitoring unit configured to monitor load in the mobile communication system, wherein the communication control unit is configured to switch communication between part of terminal apparatuses to another mobile communication network according to load information collected by the monitoring unit.

(Supplementary Note 11)

The operating system according to supplementary note 10, wherein the communication control unit is configured to change communication quality of the communication between terminal apparatuses that is not switched to said another mobile communication network, to higher communication quality.

(Supplementary Note 12)

The operating system according to supplementary note 10 or 11, wherein said another mobile communication network includes a network of a mobile virtual network operator (MVNO).

(Supplementary Note 13)

The operating system according to any one of supplementary notes 10 to 12, wherein the part of terminal apparatuses is determined according to predetermined priority.

(Supplementary Note 14)

A method comprising:

obtaining identification information of a first terminal apparatus managed by a first mobile communication operator, and identification information of a second terminal apparatus managed by a second mobile communication operator different from the first mobile communication operator; and transmitting, to a core network node managing a terminal apparatus connected to a core network in a mobile communication system, the identification information of the first terminal apparatus and the identification information of the second terminal apparatus.

(Supplementary Note 15)

A program for causing a computer to execute the method according to supplementary note 14.

(Supplementary Note 16)

A core network of a mobile communication system, the core network comprising:

a first node configured to store pieces of identification information of a plurality of respective terminal apparatuses managed by a plurality of different mobile communication operators; and a second node configured to authenticate a terminal apparatus to be connected to the core network, based on the pieces of identification information stored in the first node.

(Supplementary Note 17)

The core network according to supplementary note 16, wherein the first node is a home subscriber server (HSS), and the second node is a mobility management entity (MME).

(Supplementary Note 18)

The mobile communication system comprising:

the core network according to supplementary note 16 or 17; and a communication control unit configured to control communication performed via the core network.

(Supplementary Note 19)

A method comprising:

storing pieces of identification information of a plurality of respective terminal apparatuses managed by a plurality of different mobile communication operators; and authenticating a terminal apparatus to be connected to a core network of a mobile communication system, based on the pieces of identification information.

This application claims priority based on JP 2020-062575 filed on Mar. 31, 2020, the entire disclosure of which is incorporated herein.

INDUSTRIAL APPLICABILITY

By sharing a mobile communication system among a plurality of mobile communication operators, provision of a more flexible service than before is enabled.

REFERENCE SIGNS LIST

100 Management System
110 Processing Unit
120 Storage Unit
130 Communication Interface
140 Input/output Unit
150 Obtaining Unit
160 First Transmitting Unit
170 Second Transmitting Unit
180 Monitoring Unit

What is claimed is:

1. A mobile communication system comprising one or more apparatuses each including a memory storing instructions and one or more processors configured to execute the instructions, the one or more apparatuses being configured to:

obtain, from a management system, identification information of a first terminal apparatus managed by a first mobile communication operator, and identification information of a second terminal apparatus managed by a second mobile communication operator different from the first mobile communication operator;

transmit, to a first core network node managing the first terminal apparatus and the second terminal apparatus connected to a core network in the mobile communication system, the identification information of the first terminal apparatus and the identification information of the second terminal apparatus, wherein the identification information is stored by the first core network node;

when a connection request from a terminal apparatus is received by a second core network node of the core network, the second core network node inquires, of the first core network node, the identification information of the terminal apparatus, the terminal apparatus being the first terminal apparatus or the second terminal apparatus; and the second core network node performs user authentication for the terminal apparatus, based on an inquiry result and notifies the terminal apparatus of an authentication result.

2. The mobile communication system according to claim 1, wherein communication between the first terminal apparatus and the second terminal apparatus is performed via a same core network.

3. The mobile communication system according to claim 1, wherein the one or more apparatuses are configured to obtain the identification information of the first terminal apparatus and the identification information of the second terminal apparatus registered by each of the first mobile communication operator and the second mobile communication operator.

4. The mobile communication system according to claim 1, wherein the first core network node is a home subscriber server (HSS).

5. The mobile communication system according to claim 1, wherein the identification information of the first terminal apparatus includes a first international mobile subscriber identity (IMSI) and the identification information of the second terminal apparatus includes a second IMSI.

6. The mobile communication system according to claim 1, the one or more apparatuses are further configured to:
transmit the identification information of the first terminal apparatus and the identification information of the second terminal apparatus to a communication control unit configured to control communication via the core network shared by the first mobile communication operator and the second mobile communication operator, wherein
the communication control unit is configured to permit, based on the identification information of the first terminal apparatus and the identification information of the second terminal apparatus, communication between a plurality of first terminal apparatuses managed by the first mobile communication operator and communication between a plurality of second terminal apparatuses managed by the second mobile communication operator,
wherein the plurality of first terminal apparatuses comprises the first terminal apparatus, and the plurality of second terminal apparatuses comprises the second terminal apparatus.

7. The mobile communication system according to claim 6, wherein the communication control unit is configured to permit communication between the first terminal apparatus and the second terminal apparatus in a predetermined period.

8. The mobile communication system according to claim 7, wherein the communication between the first terminal apparatus and the second terminal apparatus is permitted according to an indication by each of the first mobile communication operator and the second mobile communication operator.

9. The mobile communication system according to claim 8, the communication between the first terminal apparatus and the second terminal apparatus is permitted when a disaster occurs or when a congestion occurs in the mobile communication system.

10. The mobile communication system according to claim 6, the one or more apparatuses are further configured to:
monitor load in the mobile communication system, wherein
the communication control unit is configured to switch communication between a subset of terminal apparatuses to another mobile communication system according to load information collected by the one or more apparatuses.

11. The mobile communication system according to claim 10, wherein the communication control unit is configured to change communication quality of the communication between terminal apparatuses that is not switched to said another mobile communication system, to higher communication quality.

12. The mobile communication system according to claim 10, wherein said another mobile communication system includes a network of a mobile virtual network operator (MVNO).

13. The mobile communication system according to claim 10, wherein the subset of terminal apparatuses is determined according to predetermined priority.

14. A method comprising:
obtaining, from a management system, identification information of a first terminal apparatus managed by a first mobile communication operator, and identification information of a second terminal apparatus managed by a second mobile communication operator different from the first mobile communication operator;
transmitting, to a first core network node managing the first terminal apparatus and the second terminal apparatus connected to a core network in a mobile communication system, the identification information of the first terminal apparatus and the identification information of the second terminal apparatus, wherein the identification information is stored by the first core network node;
inquiring, by a second core network node of the core network, when a connection request from a terminal apparatus is received by the second core network node, of the first core network node, the identification information of the terminal apparatus, the terminal apparatus being the first terminal apparatus or the second terminal apparatus; and
performing, by the second core network node, user authentication for the terminal apparatus, based on an inquiry result and notifying the terminal apparatus of an authentication result.

* * * * *